(12) United States Patent
Pappu

(10) Patent No.: US 10,691,249 B2
(45) Date of Patent: Jun. 23, 2020

(54) TOUCH HOST CONTROLLER

(71) Applicant: Intel Corporation, Santa Clara, CA (US)

(72) Inventor: Lakshminarayana Pappu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 15/720,469

(22) Filed: Sep. 29, 2017

(65) Prior Publication Data

US 2019/0102032 A1 Apr. 4, 2019

(51) Int. Cl.
*G06F 3/041* (2006.01)
*G02F 1/1333* (2006.01)
*G06F 11/22* (2006.01)
*G06F 11/27* (2006.01)

(52) U.S. Cl.
CPC ........ *G06F 3/0416* (2013.01); *G02F 1/13338* (2013.01); *G06F 3/0412* (2013.01); *G06F 11/2221* (2013.01); *G06F 11/27* (2013.01)

(58) Field of Classification Search
CPC .................................................. G06F 11/2221
See application file for complete search history.

(56) References Cited

U.S. PATENT DOCUMENTS

| | | | | |
|---|---|---|---|---|
| 5,822,568 A * | 10/1998 | Swanstrom | ............. | G06F 13/28 703/24 |
| 6,941,499 B1 * | 9/2005 | Sung | ................... | G06F 17/5022 703/15 |
| 2005/0034041 A1 * | 2/2005 | Casarsa | .............. | G01R 31/3004 714/733 |
| 2011/0022892 A1 * | 1/2011 | Zhang | ..................... | G06F 11/24 714/27 |
| 2011/0288846 A1 * | 11/2011 | Kihas | ..................... | G05B 17/02 703/13 |
| 2012/0226942 A1 * | 9/2012 | Gangasani | .............. | G06F 11/27 714/30 |
| 2012/0324302 A1 * | 12/2012 | Arslan | ........... | G01R 31/318572 714/727 |
| 2015/0256274 A1 * | 9/2015 | Olgaard | ................. | H04B 17/24 455/67.14 |

* cited by examiner

*Primary Examiner* — Michael J Dalbo
(74) *Attorney, Agent, or Firm* — Schwegman Lundberg & Woessner, P.A.

(57) ABSTRACT

An electronic device, an electronic system, or a method may be used for testing an electronic device. The electronic device may include a virtual touch circuit. The virtual touch circuit may be configured to transmit testing data. The testing data may represent sensory input data. The electronic device may include a touch host controller. The touch host controller may be configured to process sensory data inputs. The sensory data inputs may include the testing data. The electronic device may include a validation circuit. The validation circuit may be configured to evaluate performance of the touch host controller. The validation circuit may evaluate the performance of the touch host controller by using the testing data that was processed by the touch host controller. The touch host controller, the virtual touch circuit, and the validation circuit may be included in a single die.

20 Claims, 4 Drawing Sheets

TOUCH HOST CONTROLLER

BACKGROUND

Touch host controllers may process data inputs generated in response to a user interacting with a touch interface device. Testing of the touch host controller may require the touch interface device to communicate with the touch host controller.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
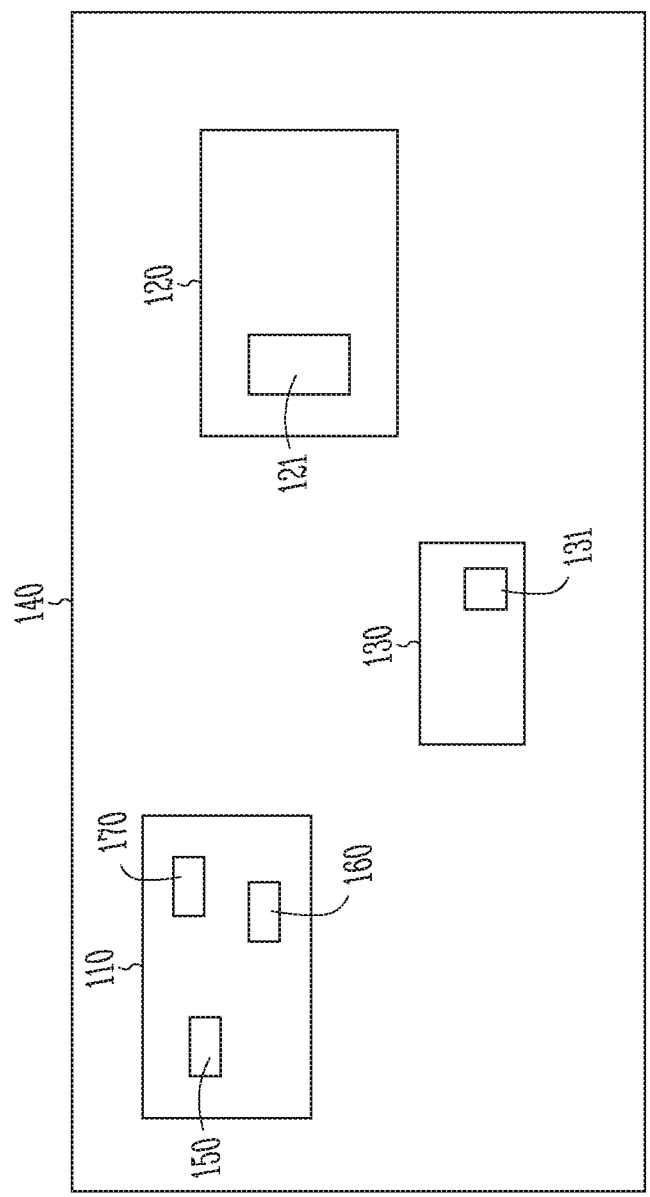
FIG. 1 illustrates a portion of an electronic device.

Aspect 1 may include or use subject matter (such as an apparatus, a system, a device, a method, a means for performing acts, or a device readable medium including instructions that, when performed by the device, may cause the device to perform acts), such as may include or use an electronic device. The electronic device may include a single die. The single die may include a virtual touch circuit. The virtual touch circuit may be configured to transmit testing data. The testing data may represent sensory input data. The testing data may represent simulated sensory input data. The single die may include a touch host controller. The touch host controller may be configured to process sensory data inputs. The sensory data inputs may include the testing data. The single die may include a validation circuit. The validation circuit may be configured to evaluate performance of the touch host controller. The validation circuit may evaluate performance by using the testing data processed by the touch host controller. The validation circuit may be configured to provide an output indicative of whether the virtual touch circuit is performing as intended.

Aspect 2 may include or use, or may optionally be combined with the subject matter of Aspect 1, to optionally include or use that the virtual touch circuit includes a first communication circuit. The first communication circuit may be configured to facilitate the electrical communication of the virtual touch circuit within the electronic device. The touch host controller may include a second communication circuit. The second communication circuit may be in electrical communication with the first communication circuit.

Aspect 3 may include or use, or may optionally be combined with the subject matter of one or any combination of Aspects 1 or 2 to optionally include or use a data generator configured to generate the testing data.

Aspect 4 may include or use, or may optionally be combined with the subject matter of one or any combination of Aspects 1 through 3 to optionally include or use one or more multiplexers. The one or more multiplexers may be configured to be in electrical communication with the virtual touch device. The one or more multiplexers may be configured to receive electrical signals from one or more isolated reception channels and transmit the electrical signals into a single transmission channel.

Aspect 5 may include or use, or may optionally be combined with the subject matter of one or any combination of Aspects 1 through 4 to optionally include or use an interrupt controller. The interrupt controller may be configured to transmit an interrupt signal to a direct memory access controller.

Aspect 6 may include or use, or may optionally be combined with the subject matter of one or any combination of Aspects 1 through 5 to optionally include or use that the testing data may be transmitted in response to the reception of the interrupt signal.

Aspect 7 may include or use, or may optionally be combined with the subject matter of one or any combination of Aspects 1 through 6 to optionally include or use one or more signature collectors. The one or more signature collectors may be configured to monitor electrical communication between the virtual touch circuit and the touch host controller.

Aspect 8 may include or use, or may optionally be combined with the subject matter of one or any combination of Aspects 1 through 7 to optionally include or use that the electronic device is in communication with a touch interface device.

Aspect 9 may include or use subject matter (such as an apparatus, a system, a device, a method, a means for performing acts, or a device readable medium including instructions that, when performed by the device, may cause the device to perform acts), such as may include or use an electronic device. The electronic device may include a virtual touch circuit. The virtual touch circuit may be configured to transmit testing data. The testing data may represent sensory input data. The electronic device may include a touch host controller. The touch host controller may be configured to process sensory data inputs. The processed sensory data inputs may include the testing data. The processed testing data may have a first signature representative of the processed testing data.

The electronic device may include a validation circuit. The validation circuit may be configured to compare the first signature with a second signature to determine whether the touch host controller is faulty. The second signature may be representative of an anticipated result of the touch host controller processing the testing data. The touch host controller, virtual touch circuit, and the validation circuit may be included in a single die.

Aspect 10 may include or use, or may optionally be combined with the subject matter of Aspect 9, to optionally include or use one or more signature collectors. The one or more signature collectors may be configured to monitor electrical communication between the virtual touch circuit and the touch host controller.

Aspect 11 may include or use, or may optionally be combined with the subject matter of Aspect 10 to optionally include or use that the one or more signature collectors may be configured to generate the first signature.

Aspect 12 may include or use, or may optionally be combined with the subject matter of one or any combination of Aspects 9 through 11 to optionally include or use that the one or more signature collectors may generate the first signature by compressing the testing data.

Aspect 13 may include or use, or may optionally be combined with the subject matter of one or any combination of Aspects 9 through 12 to optionally include or use that the validation circuit may be configured to compare the first signature with the second signature to determine validity of the first signature. Validity of the first signature may signify the degree with which the first signature corresponds to the second signature.

Aspect 14 may include or use, or may optionally be combined with the subject matter of one or any combination of Aspects 9 through 13 to optionally include or use that the validation circuit may be configured to detect the occurrence of errors in the processing of the testing data, such as by comparing the first signature with the second signature.

Aspect 15 may include or use, or may optionally be combined with the subject matter of one or any combination of Aspects 9 through 14 to optionally include or use that the testing data may mimic user-generated touch interface data. The user-generated touch interface data may correspond to a user interacting with a touch interface device. The user-generated touch interface data may simulate a user interacting with a touch interface device.

Aspect 16 may include or use subject matter (such as an apparatus, a system, a device, a method, a means for performing acts, or a device readable medium including instructions that, when performed by the device, may cause the device to perform acts), such as may include or use a method for testing an electronic device. The method may include transmitting testing data from a virtual touch device. The virtual touch device may be located on a die. The method may include processing the testing data with a touch host controller. The touch host controller may be located on the die. The method may include evaluating the performance of the touch host controller. The performance of the touch host controller may be evaluated with a validation circuit using the processed testing data. The validation circuit may be located on the die.

Aspect 17 may include or use, or may optionally be combined with the subject matter of Aspect 16, to optionally include or use transmitting an interrupt signal.

Aspect 18 may include or use, or may optionally be combined with the subject matter of Aspect 17 to optionally include or use producing the testing data with a data generator in response to the interrupt signal.

Aspect 19 may include or use, or may optionally be combined with the subject matter of one or any combination of Aspects 16 through 18 to optionally include or use monitoring electrical communication between the virtual touch device and the touch host controller with one or more signature collectors.

Aspect 20 may include or use, or may optionally be combined with the subject matter of one or any combination of Aspects 16 through 19 to optionally include or use generating a first signature with the one or more signature collectors. The first signature may be representative of the processed testing data.

Aspect 21 may include or use, or may optionally be combined with the subject matter of Aspect 20 to optionally include or use that the validation circuit may evaluate the performance of the touch host controller by determining whether the touch host controller correctly processed the testing data, such as by comparing the first signature with a second signature. The second signature may be representative of an anticipated result of the touch host controller processing the testing data.

Aspect 22 may include or use, or may optionally be combined with the subject matter of one or any combination of Aspects 16 through 21 to optionally include or use that the first signature may be generated by compressing the processed testing data.

Each of these non-limiting examples may stand on its own, or may be combined in various permutations or combinations with one or more of the other examples.

This overview is intended to provide an overview of subject matter of the present patent application. It is not intended to provide an exclusive or exhaustive explanation of the invention.

FIG. 1 illustrates a portion of an electronic device 100. The electronic device 100 may include a first die 110, a second die 120, and a third die 130. The first die 110, the second die 120, and the third die 130 may be coupled to a substrate 140. The substrate 140 may be configured to facilitate electrical communication between the first die 110, the second die 120, and the third die 130. The substrate 140 may be configured to facilitate the electrical communication between the first die 110, the second die 120, and the third die 130 and other components (e.g., a display, touch interface device, wireless communication devices, or the like). The second die 120 may include a processor 121. The third die 130 may include memory 131 (e.g., RAM, DRAM, or the like).

The first die 110 may include a touch host controller 150. The first die 110 may include a virtual touch device 160. The first die 110 may include a validation circuit 170. In an example, the touch host controller 150, the virtual touch device 160, and the validation circuit 170 are all included in the first die 110. The touch host controller 150 may be configured to facilitate the interaction (e.g., electrical communication) between a physical touch interface device (e.g., a touch screen, a multi-touch screen, a stylus, a trackpad, or the like) and a primary device (e.g., a tablet computer, a laptop, a smartwatch, the second die 120, the third die 130, or the like).

Figure 2:
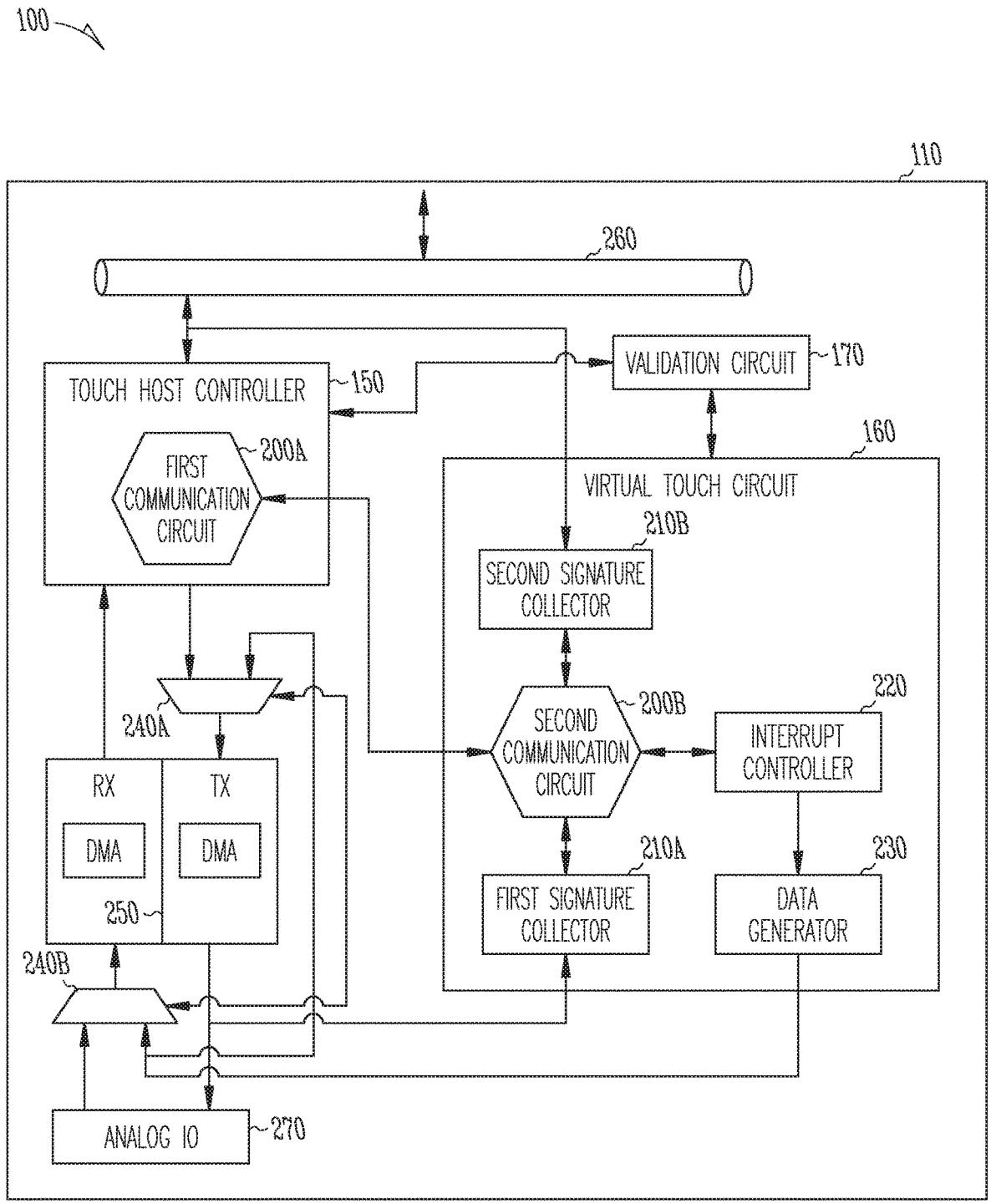
FIG. 2 illustrates a detailed view of the first die of FIG. 1.

FIG. 2 illustrates a detailed view of the first die 110 of FIG. 1. In an example, the first die 110 of FIG. 1 includes the touch host controller 150, the virtual touch circuit 160, and the validation circuit 170. The virtual touch circuit 160 may be configured to transmit testing data. The testing data may represent sensory input data (e.g., the data that is generated in response to a user interacting with a touch interface device, such as a multi-touch screen). The testing data may mimic (e.g., simulate) user-generated touch interface data corresponding to a user interacting with a touch interface device. The testing data may include sensory data inputs that tests the functionality of the touch host controller 150.

The electronic device 100 may include a first communication circuit 200A. The electronic device 100 may include a second communication circuit 200B. The touch host controller 150 may include the first communication circuit 200A. The first communication circuit 200A may be configured to facilitate the electrical communication of the touch host controller 150 within the electronic device 100. The first communication circuit 200A may be a side band router. The virtual touch circuit 160 may include the second communication circuit 200B. The second communication circuit 200B may be configured to facilitate the electrical communication of the virtual touch circuit 160 within the electronic device 100. The second communication circuit 200B may be a side band router. The first communication circuit 200A may be in electrical communication with the second communication circuit 200B. The first communication circuit 200A and the second communication circuit 200B may receive external signals (e.g., from outside the electronic device 100).

The electronic device 100 may include a data generator 230. The data generator 230 may be included in the virtual touch circuit 160. The data generator 230 may be configured to generate and/or transmit the testing data. The data generator 230 may be programmed with a predetermined set of testing data. The data generator 230 may be in electrical communication with the second communication circuit 200B. The data generator 230 may be programmed through the second communication circuit 200B. The second communication circuit 200B may receive an external signal to program the data generator 230. The data generator 230 may transmit the testing data to the touch host controller 150. The data generator 230 may transmit the testing data in response to an interrupt signal. The interrupt signal may be provided by an interrupt controller 220. The interrupt controller 220 may transmit the interrupt signal to a direct memory access controller 250 (e.g., such as by communicating with the second communication module 200B). The direct memory access controller 250 may be configured to access system memory. The direct memory access controller 250 may include a transmission portion. The direct memory access controller may include a receiving portion. The data generator 230 may in communication with the system memory (e.g., on the third die 130).

The electronic device 100 may include a first multiplexer 240A. The electronic device 100 may include a second multiplexer 240B. The electronic device 100 may include additional multiplexers. The first multiplexer 240A and the second multiplexer 240B may be configured to be in electrical communication with the touch host controller 150 and the virtual touch circuit 160. The first multiplexer 240A and the second multiplexer 240B may be configured to receive electrical signals from one or more isolated reception channels and transmit the electrical signals into a single transmission channel.

The validation circuit 170 may be configured to determine whether the touch host controller 150 is faulty. The validation circuit 170 may be configured to evaluate the performance of the touch host controller 150. The validation circuit 170 may evaluate the performance of the touch host controller 150 by using the testing data that has been processed by the touch host controller 150. The validation circuit 170 may compare the expected (e.g., anticipated) outcome of the touch host controller 150 processing the testing data to the actual result of the testing data being processed by the touch host controller 150.

The electronic device may include a first signature collector 210A. The electronic device 100 may include a second signature collector 210B. The first signature collector 210A and the second signature collector 210B may be configured to monitor (e.g., capture, evaluate, record, or the like) the electrical communication between the virtual touch circuit 160 and the touch host controller 150. The first signature collector 210A may be configured to generate a first signature. The first signature may be representative of (e.g., corresponding to) the testing data. The second signature collector 210B may be configured to generate a second signature. The second signature may be representative of the processed result of the touch host controller 150 processing the testing data. The second signature may be representative of the expected outcome of the touch host controller 150 processing the testing data. In an example, the first signature collector 210A and the second signature collector 210B may compress the data being exchanged between the touch host controller 150 and the virtual touch circuit 160. The compressing of the data exchanged between the touch host controller 150 and the virtual touch circuit 160 may produce the first signature and the second signature.

In an example, the data generator 230 is configured to transmit the testing data. The first signature collector 210A may monitor the transmission of the testing data from the data collector 230 to the touch host controller 150. The first signature collector 210A may compress the testing data and generate the first signature. Compression of the testing data may yield a reproducible result. For example, the compression of the testing data in a first instance may yield the same first signature as the compression of the testing data in a second instance. The touch host controller 150 may process the testing data and transmit the processed testing data to other components, such as a primary scalable fabric 260. The primary scalable fabric 260 may be an electrical communication pathway configured for the transmission of electrical signals between components of the electronic device 100, such as the second die 120 and/or the third die 130. The primary scalable fabric 260 may be a high-priority (e.g., high-speed or low latency) electrical communication pathway.

The second signature collector 210B may monitor the transmission of the processed testing data from the touch host controller 150 to the other components. The second signature collector 210B may compress the processed testing data and generate the second signature. Compression of the processed testing data may yield a reproducible result if the testing data was processed as designed. For example, the compression of the processed testing data in a first instance may yield the same second signature as the compression of the testing data in a second instance when the touch host controller 150 processes the testing data as anticipated. Conversely, the compression of the processed testing data in a third instance may yield a different second signature as the compression of the testing data in a second instance when the touch host controller 150 does not process the testing data as anticipated (e.g., when errors occur).

The validation circuit 170 may be configured to compare the first signature to a third signature. The third signature may be representative of the expected result of the compression of the testing data. The validation circuit 170 may be configured to compare the second signature to a fourth signature. The fourth signature may be representative of the anticipated result of the touch host controller 150 processing the testing data. The third signature and the fourth signature may be programmed into the validation circuit 170, such as by communicating with the first communication circuit 200A or the second communication circuit 200B.

The comparison of the first signature with the third signature may be used to verify that the testing data was transmitted to the touch host controller 150 properly (e.g., as anticipated, as intended, or correctly). For example, the validation circuit 170 may determine the validity of the transmitted testing data by comparing the first signature with the third signature. Validity may signify the degree with which the first signature corresponds to the third signature. The comparison of the second signature with the fourth signature may be used to verify that the touch host controller 150 correctly processed the testing data. For example, the validation circuit 170 may determine the validity of the processed testing data by comparing the second signature with the fourth signature. Validity may signify the degree with which the second signature corresponds to the fourth signature. The touch host controller 150 correctly processing the testing data may include that the result of the touch host controller 150 processing of the testing data yields an anticipated result. Validity may signify the detection of errors in the processing of the testing data, such as by comparing the second signature with the fourth signature. The validation circuit 170 may be configured to provide an output indicative of whether the touch host controller 150 is performing as intended (e.g., validity is present).

Deviations of the second signature from the fourth signature may indicate that a defect is present in the touch host controller 150. The comparison of the second signature with the fourth signature may be used to isolate the location of the defect in the touch host controller 150. The comparison of the second signature with the fourth signature may be used to evaluate the performance of the touch host controller. If the processed testing data does not correlate with (e.g., correspond to, or match) the anticipated result, the touch host controller 150 may not be performing within design specifications. In an example, the second signature may vary partially from the fourth signature, and thereby indicate that a portion of the touch host controller 150 is defective or otherwise malfunctioning. However, when the second signature varies from the fourth signature, the touch host controller 150 may still operate within design specifications. For example, when the second signature does not exactly match the fourth signature, the touch host controller 150 may still perform as intended.

Evaluating the performance of, and detecting defects in, the touch host controller 150 may prevent a faulty or otherwise defective touch host controller 150 from being incorporated into a primary device (e.g., a tablet computer, a laptop computer, a cellular device, a smartwatch, or the like). Preventing the incorporation of a faulty touch host controller 150 into the primary device may prevent waste and reduce costs associated with manufacturing and providing technical support for the primary device. Preventing the incorporation of a faulty touch host controller 150 into the primary device may prevent waste such as by reducing the need to replace the faulty touch host controller 150 within the primary device or preventing damage to the primary device. Additionally, preventing the incorporation of a faulty touch host controller 150 into the primary device may reduce costs by minimizing the number of faulty primary devices reaching end-users and thereby decrease the amount of technical support the end-user or original equipment manufacturers may require. Further, preventing the incorporation of a faulty touch host controller 150 into the primary device may reduce costs by decreasing the amount of primary devices being returned to the original equipment manufacturer.

The electronic device 100 may overcome the need for a physical touch interface device to interact with the touch host controller during testing, such as by providing the necessary circuitry on the same die (e.g., the first die 110) as the touch host controller 150, that is required for the touch host controller 150 to receive and process the testing data. The electronic device 100 may eliminate the need for a physical touch interface device during testing because the circuitry required for the transmission of the testing data to the touch host controller 150 may already be present within the electronic device 100. The physical touch interface device may be substantially more expensive than the electronic device 100.

Incorporation of the physical touch interface device into a testing system configured to test large quantities of touch host controllers may be difficult or inefficient, in comparison to utilization of the electronic device 100. Difficulties associated with incorporating the physical touch interface device into the testing system may include overcoming clock determinism issues. Clock determinism may involve the expectation that hardware (e.g., the touch host controller 150, the second die 120, or the third die 130) will behave identically clock cycle by clock cycle, such as between systems or the same system every time the system is powered on. Clock determinism may be a complex requirement. Clock determinism may not be implemented without spending significant hardware resources.

Alternative (and or competing) methods of sending external tester signals through the analog input/output logic (e.g., through the analog IO 270) into the system may face a significant chance of non-determinism due to analog behavior of the logic operations as the tester signals traverse through the analog input/output logic. The electronic device 100 may obviate clock determinism issues because the logic may be completely embedded on the same die as the device under testing. Thus, the electronic device 100 may not require any external interface signals to pass through the analog input/output logic in order to test the device under testing (e.g., the touch host controller 150).

Incorporation of the physical touch interface device into the testing system may be substantially more expensive than including the electronic device 100 in each device to be tested by the testing system. The electronic device 100 may reduce testing system complexity, such as by eliminating the need for a physical touch interface device to be implemented into the testing system, and thereby decrease the costs associated with evaluating the performance of the touch host controller 150.

Figure 3:
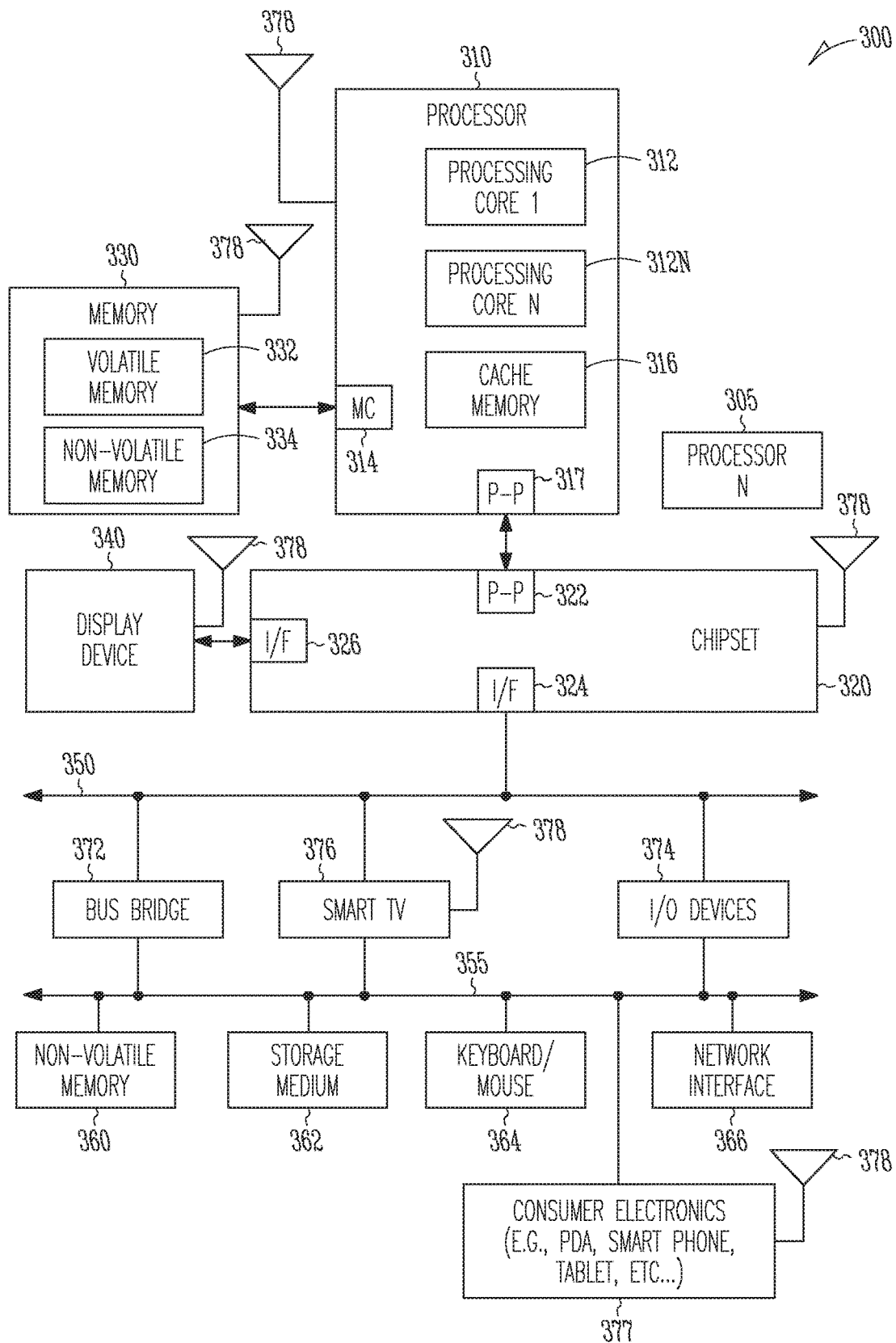
FIG. 3 illustrates a system level diagram, depicting an example of an electronic device (e.g., system) including the electronic device as described in the present disclosure.

FIG. 3 illustrates a system level diagram, depicting an example of an electronic device (e.g., system) including the electronic device 100 as described in the present disclosure. FIG. 3 is included to show an example of a higher level device application for the electronic device 100. In one embodiment, system 300 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 300 is a system on a chip (SOC) system.

In one embodiment, processor 310 has one or more processor cores 312 and 312N, where 312N represents the Nth processor core inside processor 310 where N is a positive integer. In one embodiment, system 300 includes multiple processors including 310 and 305, where processor 305 has logic similar or identical to the logic of processor 310. In some embodiments, processing core 312 includes, but is not limited to, pre-fetch logic to fetch instructions, decode logic to decode the instructions, execution logic to execute instructions and the like. In some embodiments, processor 310 has a cache memory 316 to cache instructions and/or data for system 300. Cache memory 316 may be organized into a hierarchal structure including one or more levels of cache memory.

In some embodiments, processor 310 includes a memory controller 314, which is operable to perform functions that enable the processor 310 to access and communicate with memory 330 that includes a volatile memory 332 and/or a non-volatile memory 334. In some embodiments, processor 310 is coupled with memory 330 and chipset 320. Processor 310 may also be coupled to a wireless antenna 378 to communicate with any device configured to transmit and/or receive wireless signals. In one embodiment, an interface for wireless antenna 378 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 332 includes, but is not limited to, Synchronous Dynamic Random Access Memory (SDRAM), Dynamic Random Access Memory (DRAM), RAIVIBUS Dynamic Random Access Memory (RDRAM), and/or any other type of random access memory device. Non-volatile memory 334 includes, but is not limited to, flash memory, phase change memory (PCM), read-only memory (ROM), electrically erasable programmable read-only memory (EEPROM), or any other type of non-volatile memory device.

Memory 330 stores information and instructions to be executed by processor 310. In one embodiment, memory 330 may also store temporary variables or other intermediate information while processor 310 is executing instructions. In the illustrated embodiment, chipset 320 connects with processor 310 via Point-to-Point (PtP or P-P) interfaces 317 and 322. Chipset 320 enables processor 310 to connect to other elements in system 300. In some embodiments of the example system, interfaces 317 and 322 operate in accordance with a PtP communication protocol such as the Intel® QuickPath Interconnect (QPI) or the like. In other embodiments, a different interconnect may be used.

In some embodiments, chipset 320 is operable to communicate with processor 310, 305N, display device 340, and other devices, including a bus bridge 372, a smart TV 376, I/O devices 374, nonvolatile memory 360, a storage medium (such as one or more mass storage devices) 362, a keyboard/mouse 364, a network interface 366, and various forms of consumer electronics 377 (such as a PDA, smart phone, tablet etc.), etc. In one embodiment, chipset 320 couples with these devices through an interface 324. Chipset 320 may also be coupled to a wireless antenna 378 to communicate with any device configured to transmit and/or receive wireless signals.

Chipset 320 connects to display device 340 via interface 326. Display 340 may be, for example, a liquid crystal display (LCD), a plasma display, cathode ray tube (CRT) display, or any other form of visual display device. In some embodiments of the example system, processor 310 and chipset 320 are merged into a single SOC. In addition, chipset 320 connects to one or more buses 350 and 355 that interconnect various system elements, such as I/O devices 374, nonvolatile memory 360, storage medium 362, a keyboard/mouse 364, and network interface 366. Buses 350 and 355 may be interconnected together via a bus bridge 372.

In one embodiment, mass storage device 362 includes, but is not limited to, a solid state drive, a hard disk drive, a universal serial bus flash memory drive, or any other form of computer data storage medium. In one embodiment, network interface 366 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 300, the functions performed by some of these blocks may be integrated within a single semiconductor circuit or may be implemented using two or more separate integrated circuits. For example, although cache memory 316 is depicted as a separate block within processor 310, cache memory 316 (or selected aspects of 316) may be incorporated into processor core 312.

Figure 4:
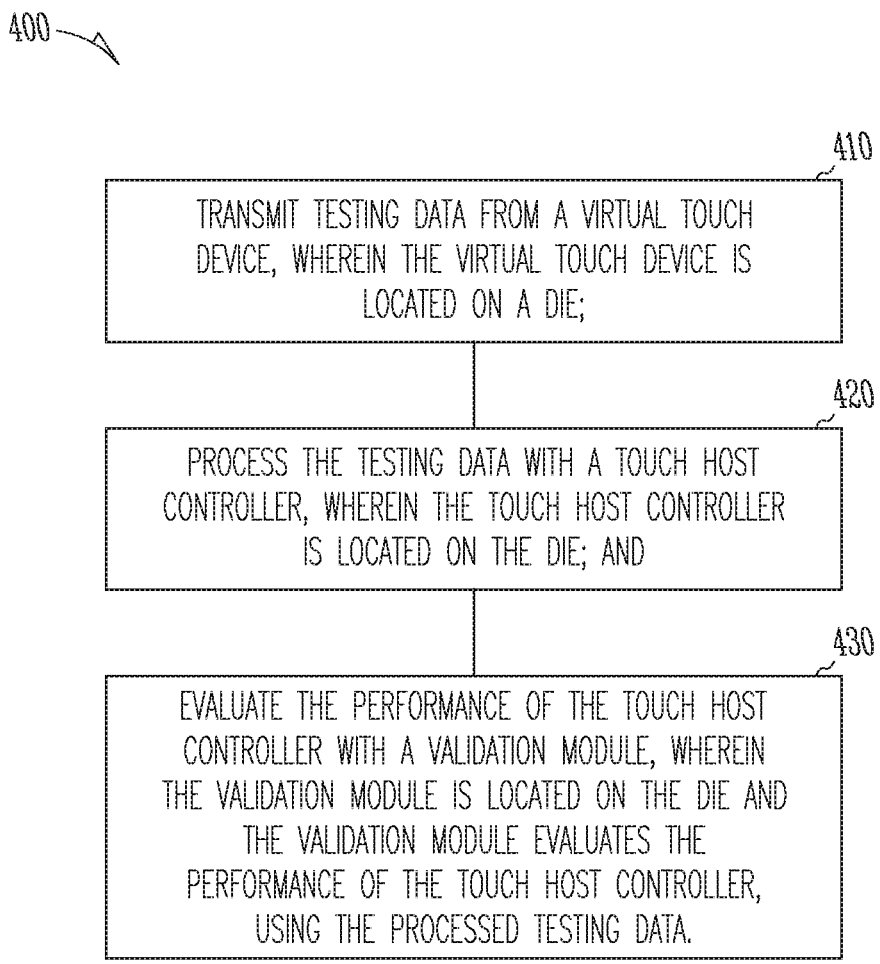
FIG. 4 illustrates a method for testing an electronic device.

FIG. 4 illustrates a method 400 for testing an electronic device or a portion of an electronic device, such as the touch host controller 150 or the electronic device 100. The method 400 may include an operation 410 to transmit testing data. The testing data may be transmitted from a virtual touch device (e.g., the virtual touch device 160 of FIGS. 1-2). The virtual touch device may be located on a die (e.g., the first die 110 of FIGS. 1-2). The method 400 an operation 420 to process the testing data. The testing data may be processed with a touch host controller (e.g., the touch host controller 150 of FIGS. 1-2). The touch host controller may be located on the die. The method 400 may include an operation 430 to evaluate the performance of the touch host controller. The performance of the touch host controller may be evaluated with a validation circuit (e.g., the validation circuit 170 of FIGS. 1-2). The validation circuit may be located on the die. The validation circuit may evaluate the performance of the touch host controller using the processed testing data.

The method 400 may include transmitting an interrupt signal. The method 400 may additionally include monitoring the electrical communication between the virtual touch device and the touch host controller. The electrical communication between the virtual touch device and the touch host controller may be monitored with one or more signature collectors. The method 400 may further include generating a first signature. The first signature may be generated with the one or more signature collectors. The first signature may be representative of the processed testing data. In an example, the first signature may be generated by compressing the processed testing data.

The method 400 may still yet further include that the validation circuit evaluates the performance of the touch host controller. The validation circuit may evaluate the performance of the touch host controller by determining whether the touch host controller correctly processed the testing data. The validation circuit may evaluate the performance of the touch host controller by comparing the first signature with a second signature. The second signature may be representative of an anticipated result of the touch host controller processing the testing data.

Various Notes

The above description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. An electronic device, comprising:
  a single die, including:
    a virtual touch circuit configured to transmit testing data, wherein the testing data represents sensory input data;
    a touch host controller configured to process sensory data inputs, including the testing data; and
    an interrupt controller configured to transmit an interrupt signal to a direct memory access controller, wherein the testing data is transmitted in response to the reception of the interrupt signal;
    a validation circuit configured to:
      evaluate performance of the touch host controller using the testing data processed by the touch host controller, and
      provide an output indicative of whether the virtual touch circuit is performing as intended.

2. The electronic device of claim 1, wherein:
  the virtual touch circuit includes a first communication circuit configured to facilitate the electrical communication of the virtual touch circuit within the electronic device; and
  the touch host controller includes a second communication circuit, in electrical communication with the first communication circuit.

3. The electronic device of claim 1, further comprising a data generator configured to generate the testing data.

4. The electronic device of claim 1, further comprising one or more multiplexers configured to be in electrical communication with the virtual touch device and receive electrical signals from one or more isolated reception channels and transmit the electrical signals into a single transmission channel.

5. The electronic device of claim 1, further comprising one or more signature collectors configured to monitor electrical communication between the virtual touch circuit and the touch host controller.

6. The electronic device of claim 1, wherein the electronic device is in communication with a touch interface device.

7. An electronic device, comprising:
  a virtual touch circuit configured to transmit testing data, wherein the testing data represents sensory input data;
  a touch host controller configured to process sensory data inputs, including the testing data, wherein the processed testing data has a first signature representative of the processed testing data;
  an interrupt controller configured to transmit an interrupt signal to a direct memory access controller, wherein the testing data is transmitted in response to the interrupt signal;
  a validation circuit configured to compare the first signature with a second signature to determine whether the touch host controller is faulty, wherein the second signature is representative of an anticipated result of the touch host controller processing the testing data; and
  wherein the touch host controller, virtual touch circuit, interrupt controller, and the validation circuit are included in a single die.

8. The electronic device of claim 7, further comprising one or more signature collectors configured to monitor electrical communication between the virtual touch circuit and the touch host controller.

9. The electronic device of claim 8, wherein the one or more signature collectors are configured to generate the first signature.

10. The electronic device of claim 9, wherein the one or more signature collectors generate the first signature by compressing the testing data.

11. The electronic device of claim 7, wherein the validation circuit is configured to compare the first signature with the second signature to determine validity of the first signature, and validity of the first signature signifies the degree with which the first signature corresponds to the second signature.

12. The electronic device of claim 7, wherein the validation circuit is configured to detect the occurrence of errors in the processing of the testing data by comparing the first signature with the second signature.

13. The electronic device of claim 7, wherein the testing data mimics user-generated touch interface data corresponding to a user interacting with a touch interface device.

14. A method for testing an electronic device, comprising:
   transmitting testing data from a virtual touch device, wherein the virtual touch device is located on a die, wherein the testing data is transmitted in response to an interrupt signal transmitted by an interrupt controller, wherein the interrupt controller is configured to transmit the interrupt signal to a direct memory access controller;
   processing the testing data with a touch host controller, wherein the touch host controller is located on the die; and
   evaluating the performance of the touch host controller with a validation circuit using the processed testing data, wherein the validation circuit is located on the die.

15. The method of claim 14, further comprising transmitting an interrupt signal.

16. The method of claim 15, further comprising producing the testing data with a data generator in response to the interrupt signal.

17. The method of claim 14, further comprising monitoring electrical communication between the virtual touch device and the touch host controller with one or more signature collectors.

18. The method of claim 17, further comprising generating a first signature with the one or more signature collectors, wherein the first signature is representative of the processed testing data.

19. The method of claim 18, wherein the validation circuit evaluates the performance of the touch host controller by determining whether the touch host controller correctly processed the testing data by comparing the first signature with a second signature, wherein the second signature is representative of an anticipated result of the touch host controller processing the testing data.

20. The method of claim 18, wherein the first signature is generated by compressing the processed testing data.

* * * * *